United States Patent [19]

Reetz et al.

[11] Patent Number: 4,626,579

[45] Date of Patent: Dec. 2, 1986

[54] PROCESS FOR THE QUASI-IONIC POLYMERIZATION OF ACRYLIC ACID DERIVATIVES

[75] Inventors: Manfred T. Reetz, Marburg; Ralph Ostarek, Ebsdorfergrund; Karl-Erwin Piejko, Cologne, all of Fed. Rep. of Germany

[73] Assignee: Bayer Aktiengesellschaft, Leverkusen, Fed. Rep. of Germany

[21] Appl. No.: 825,822

[22] Filed: Feb. 4, 1986

[30] Foreign Application Priority Data

Feb. 7, 1985 [DE] Fed. Rep. of Germany ....... 3504168

[51] Int. Cl.$^4$ .............................................. C08F 2/00
[52] U.S. Cl. ..................................................... 526/194
[58] Field of Search ........................................ 526/194

[56] References Cited

U.S. PATENT DOCUMENTS

| | | | |
|---|---|---|---|
| 3,655,633 | 4/1972 | Saam | 526/194 |
| 4,121,027 | 10/1978 | Pohlemann et al. | 526/194 |
| 4,543,403 | 9/1985 | Isayama et al. | 526/194 |

Primary Examiner—Paul R. Michl
Assistant Examiner—Alex H. Walker
Attorney, Agent, or Firm—Sprung Horn Kramer & Woods

[57] ABSTRACT

The invention relates to a process for the quasi-ionic polymerization of acrylic acid derivatives, in which the polymerization is initiated by using special mercaptosilanes as initiators in the presence of nucleophilic or electrophilic catalysts.

8 Claims, No Drawings

PROCESS FOR THE QUASI-IONIC POLYMERIZATION OF ACRYLIC ACID DERIVATIVES

The invention relates to a new process for the quasi-ionic polymerization of acrylic acid derivatives.

Processes for the ionic or quasi-ionic polymerization of polar monomers containing a double bond located in the α-position relative to the polar group are known (see, for example, U.S. Pat. Nos. 4,351,924, 4,414,372 and 4,417,034). In accordance with these known processes and the ionic polymerization is initiated by means of initiators and the quasi-ionic polymerizations are initiated by means of initiators in the presence of nucleophilic or electrophilic catalysts. A process for the preparation of polyalkyl methacrylates containing α-hydroxy-hydrocarbyl and α,ω-hydroxyhydrocarbyl groups by ionic polymerisation of alkyl methacrylates using certain organo-alkali metal compounds as initiators is described in U.S. Pat. No. 4,351,924. The process has the serious disadvantage that polymerisation temperatures of −70° C. or lower are required in order to achieve the desired narrow molecular weight distribution, and that the desired narrow molecular weight distribution is also obtained only with methacrylates.

A (quasi-ionic) process, related to ionic polymerization, for the polymerization of monomers containing polar groups is described in U.S. Pat. Nos. 4,414,372 and 4,417,034. The initiators used in this process are silicon, tin and germanium compounds in which the elements mentioned are attached to O or C atoms, for example trimethylsilyl cyanide or trimethylsilylketene acetals. However, the process has the disadvantage that, if acrylates are used as monomers at room temperature, it provides either only living polymers having a broad molecular weight distribution (if nucleophilic catalysts, for example bifluoride ions, are used) or else no living polymers at all (if electrophilic catalysts, such as zinc iodide, are used) see Macromolecules 1984, volume 17, No. 7, pages 1415–1417).

It has now been found, surprisingly, that living polymers having the desired narrow molecular weight distribution are obtained in the quasi-ionic polymerization of acrylic acid derivatives as polar monomers containing a double bond located in the α-position relative to the polar group, even if polymerization temperatures >0° C. are used, if special mercaptosilanes are used as initiators and if polymerization is carried out in the presence of nucleophilic or electrophilic catalysts.

The invention therefore relates to a process for the quasi-ionic polymerization of acrylic acid derivatives, in which the polymerization is initiated using organosilicon compounds as initiators in the presence of nucleophilic or electrophilic catalysts, and the polymerization is carried out at temperatures from −100° to +100° C., if appropriate in an aprotic solvent; the process is characterized in that the initiators used are mercaptosilanes of the formula $$(R)_3Si-SR^1 \quad (I)$$

in which
R represents the radical of an optionally substituted aliphatic, cycloaliphatic, araliphatic or aromatic hydrocarbon and $R^1$ represents an $Si(R)_3$ radical or a $C_1$–$C_{10}$-alkyl radical which is monosubstituted or polysubstituted by trialkylsiloxy and/or trialkylsilylmercapto groups.

$R^1$ preferably represents a $C_1$–$C_{10}$-alkyl radical which is monosubstituted or polysubstituted by trialkylsilylmercapto groups.

The following may be mentioned as examples of preferred representatives of the initiators to be used in accordance with the invention: 1-(trimethylsilylmercapto)-2-(trimethylsilyloxy)-ethane, bis-(trimethylsilyl)-sulphide and, in particular, 1,2-bis-(trimethylsilylmercapto)-ethane and 1,4-bis-(trimethylsilylmercapto)-butane.

The following may be mentioned as examples of radicals of optionally substituted aliphatic, cycloaliphatic, araliphatic or aromatic hydrocarbons for R: aliphatic hydrocarbon radicals, for example the methyl, ethyl, n-propyl, isobutyl, n-hexyl or 2-ethylhexyl radical; cycloaliphatic radicals, such as the cyclopentyl, methylcyclopentyl, cyclohexyl, methylcyclohexyl, dimethylcyclohexyl and tertiary-butylcyclohexyl radical; araliphatic hydrocarbon radicals, such as the benzyl, α-methylbenzyl, 2-methylbenzyl, 3-methylbenzyl, 4-methylbenzyl and 2-phenylethyl radical; and aromatic hydrocarbon radicals such as the phenyl radical and the tolyl and xylyl radicals.

Owing to the ready accessibility of the trisalkylsilyl compounds, in particular the trimethylsilyl compounds, R is preferably a $C_1$–$C_4$-alkyl group, particularly preferably a methyl group.

The following may be mentioned as examples of $C_1$–$C_{20}$-alkyl radicals which are monosubstituted or polysubstituted by trialkylsiloxy and/or trialkylsilylmercapto groups for $R^1$: the 2-trimethylsiloxyethyl, 2-trimethylsilylmercaptoethyl, 3-triethylsilylmercaptopropyl, 4-trimethylsilylmercaptobutyl, 1,3-di-(trimethyl-silyloxy)-prop-2-yl, 1,3-di-(trimethylsilylmercapto)-prop-2-yl, 1-trimethylsilylmercapto-3-trimethylsiloxy-prop-2-yl, 1-trimethylsilylmercapto-2-trimethylsiloxy-prop-3-yl and 1,2-di-(trimethylsilylmercapto)-prop-3-yl radical.

Compared with the silylated ketene acetals described as initiators, inter alia, in U.S. Pat. No. 4,414,372, apart from the advantage already mentioned earlier of providing living polymers having a narrow molecular weight distribution even in the case of acrylic acid derivatives at room temperature, the mercaptosilanes to be used as initiators in accordance with the invention have the further advantage that they are very much more readily accessible and therefore much cheaper. Quasi-ionic polymerizations can also be carried out on an industrial scale using the mercaptosilanes to be used as initiators in accordance with the invention.

The mercaptosilanes to be used as initiators in accordance with the invention are commercially available or can be prepared in accordance with known methods by silylating the corresponding mercaptans (see, for example, D. A. Evans, J. Am. Chem. Soc. 99, 5009 (1977); and R. S. Glass, J. Organomet. Chem. 61, 83 (1973). Since even small amounts of impurities have an interfering effect on the polymerization, only mercaptosilanes which have been carefully purified—for example by fractional distillation—should be employed.

The initiators to be used in accordance with the invention are employed in an amount such that the molar ratio of monomer to initiator is at least 1:1, preferably 5:1 to 1000:1.

The initiators to be used in accordance with the invention are used together with the catalysts customarily used for such quasi-ionic polymerizations of polar monomers containing a double bond located in the α-position relative to the polar group. These catalysts are described, for example, in U.S. Pat. No. 4,414,034, column 6, Line 55-column 7, line 15.

Of these catalysts zinc iodide, diisobutylaluminium chloride, tris-(dimethylamino)-sulphonium difluorotrimethyl silicate (TASF), tetrabutylammonium fluoride (TBAF), tris-(dimethylamino)-sulphonium bifluoride (TASHF$_2$), tetraalkylammonium bifluorides, potassium bifluoride and benzyltrimethylammonium fluoride and bifluoride have proved particularly suitable.

It is preferable to use catalysts forming fluoride ions, such as tris-(dimethylamino)-sulphonium difluorotrimethylsilicate (TASF), tetrabutylammonium fluoride (TBAF) and benzyltrimethylammonium fluoride. Catalysts forming bifluoride ions are particularly preferred, such as tris-(dimethylamino)-sulphonium bifluoride (TASHF$_2$), tetraalkylammonium bifluorides, potassium bifluoride and benzyltrimethylammonium bifluoride.

The preparation of the preferentially used catalyst TASF is described in U.S. Pat. No. 3,940,402 and that of the corresponding bifluoride (TASHF$_2$) in "Polymer Preprints ACS Washington, 24, 52 (1983)".

The molar ratio of initiator to catalyst is between 500:1 and 0.1:1, preferably between 100:1 and 1:1 and particularly preferably 10:1 and 1:1.

The polymerization process according to the invention can be carried out at temperatures from −50° to +100° C.; the polymerization is preferably carried out at temperatures from 0° to +50° C.

As is generally customary for ionic polymerizations, the polymerization according to the invention is carried out in an inert gas atmosphere, for example nitrogen, and with the exclusion of moisture.

The polymerization process according to the invention is preferably carried out in an aprotic solvent. Suitable aprotic solvents are those which dissolve th reactants (monomers, initiator and catalyst) to an adequate extent at the reaction temperature envisaged, for example methyl acetate, propionitrile, acetonitrile, toluene, xylene, methylene chloride, 1,1,1-trichloroethane, bromobenzene, dimethylformamide, N,N-dimethylacetamide, N-methylpyrrolidone, anisole, tetrahydrofuran and 2-(butoxy)-ethoxytrimethylsilane. The choice of solvent depends inter alia on the nature of the catalyst whereas hydrocarbons and chlorinated hydrocarbons are preferably used for electrophilic catalysts, the solvent preferred for nucleophilic catalysts are preferably aprotic solvents, preferably nitriles, such as acetonitrile, or ethers, such as tetrahydrofuran.

The monomer content of the polymerization solutions should be about 1-90% by weight, preferably 5-50% by weight.

The polymerization process according to the invention is preferably carried out as follows:

The mercaptosilane initiator and the catalyst are initially taken in the intended solvent. The monomer, if appropriate diluted with solvent, is added slowly, with stirring, to this mixture. The addition of the monomer can be effected immediately after the initiator and the catalyst have been mixed or after a certain preformation time; the preformation time can be up to several hours. If the polymerization is to be carried out at constant temperature, the rate at which the monomer is added depends on the possible means of removing the heat of reaction.

The process according to the invention can, however, also be carried out in another way, for example by successively adding the individual components or by simultaneously mixing all the components. It is advantageous for the narrow molecular weight distribution desired if the total amount of the initiator is present in the reaction system at the outset and if no further initiator is metered in during the polymerization.

Unless the polymerization has been discontinued by adding a terminating reagent, such as, for example, methanol or acetic acid, when the polymerization is comlete the reaction vessel contains living polymers, that is to say polymers in which the polymerization centres still remain active even after the monomers have been consumed and which can therefore be reacted with new monomers, for example to give block polymers, or with coupling reagents, such as bis-chloromethylbenzene, bis-bromomethyl-benzene or titanium tetrachloride/bromine, or can be made into functional derivatives with compounds containing functional groups, for example esters substituted by trialkylsiloxy groups, tertiary-alkyl halides or benzyl halides. These reactions of the living polymers can also be carried out after the living polymers have been processed, for example to give films or fibres, if the processing is carried out under conditions in which deactivation of the living polymers does not take place. These secondary reactions of the living polymers are known (see, for example, U.S. Pat. No. 4,417,034; and M. T. Reetz, Agnew, Chem. Int. Ed. Engl. 21, 96 (1982)).

The following may be mentioned as examples of representatives of the acrylic acid derivatives which can be employed in the polymerization process according to the invention: acrylic acid esters, such as ethyl acrylate, butyl acrylate, 2-ethylhexyl acrylate, sorbyl acrylate, 2-(dimethylamino)-ethyl acrylate, 3,3-dimethoxypropyl acrylate, 2,2,3,3,4,4,4-heptafluorobutyl acrylate, 2-cyanoethyl acrylate, 4-fluorophenyl acrylate, chloroethyl acrylate, 2-(propen-1-yloxy)-ethyl acrylate, phenyl acrylate, allyl acrylate, acrylamides, such as N,N-dimethylacrylamide, and acrylonitrile.

It is preferable to use acrylic acid esters, such as sorbyl acrylate, ethyl acrylate, butyl acrylate, 2-ethylhexyl acrylate, 2-(dimethylamino)-ethyl acrylate, 3,3-dimethoxypropyl acrylate, 2,2,3,3,4,4,4-heptafluorobutylacrylate, 2-cyanoethyl acrylate, 4-fluorophenyl acrylate, 2-chloroethyl acrylate, 2-(propen-1-yloxy)-ethyl acrylate, phenyl acrylate and allyl acrylate.

In the examples which follow the characteristic quantity D (polydispersity) is used to characterise the polymers obtained in accordance with the invention. The polydispersity D is the ratio of the mass average value of the molecular weight ($M_w$) and the number average value of the molecular weight ($M_n$) ($D = M_w/M_n$). The average values of molecular weight were determined by means of gel permeation chromatography using a universal calibration relationship.

EXAMPLE 1

10 ml of acetonitrile, 0.75 ml (2.9 mmol) of 1,2-bis-(trimethylsilylmercapto)-ethane and 0.2 ml (0.2 mmol) of a 1-molar solution of tris-(dimethylamino)-sulphonium bifluoride are initially placed, under nitrogen, in a 100 ml small flask which has been dried by heating in vacuo and is equipped with a magnetic stirrer. 5 ml (24 mmol) of 2-ethylhexyl acrylate are added dropwise to this mixture, with stirring, in the course of 30 minutes. The start of the polymerization reaction makes itself evident by the reaction mixture heating up. During the dropwise addition the reaction temperature remains between 30° and 40° C. When the addition of monomer is complete, the polymerization mixture is stirred for a further hour. The polymerization reaction is then discontinued by adding 1 ml of methanol. The polymerization mixture is freed from volatile constituents on a rotary evaporator.

4.7 g (=90% of theory) of poly-(2-ethylhexyl acrylate) are obtained: $M_n = 1.8$ kg/mol; $D = 1.24$.

EXAMPLES 2–13

The monomers listed in Table 1 are reacted as described in Example 1 with the initiator/catalyst combinations also indicated in Table 1. Zinc iodide was employed as a solid, the other catalysts in the form of a 1-molar solution in acetonitrile. The yields, number average values of molecular weights $(M)_n$ and polydispersities (D) of the polymers obtained are also shown in Table 1.

The abbreviations used in Table 1 have the following meaning:

Initiators

A = $(CH_3)_3Si-S-CH_2-CH_2-S-Si(CH_3)_3$
B = $(CH_3)_3Si-O-CH_2-CH_2-S-Si(CH_3)_3$
C = $(CH_3)_3Si-S-(CH_2)_4-S-Si(CH_3)_3$
D = $(CH_3)_3Si-S-Si(CH_3)_3$

Catalysts

TBAHF$_2$: tetrabutylammonium bifluoride
TASHF$_2$: tris-(dimethylamino)-sulphonium bifluoride
TBAF: tetrabutylammonium fluoride
BTAF: benzyltrimethylammonium fluoride
ZnI$_2$: zinc iodide Monomers BA: butyl acrylate
EHA: 2-ethylhexyl acrylate
EA: ethyl acrylate Solvents THF: tetrahydrofuran

EXAMPLE 11

The reaction is carried out as described in Example 5, except that only 3 ml (21 mmol) of butyl acrylate are added dropwise to the initiator/catalyst mixture instead of 5 ml of butyl acrylate. After the butyl acrylate has been added, the polymerization mixture is stirred for 3 hours at room temperature. A further 3 ml (21 mmol) of butyl acrylate are then added dropwise. The start of the polymerization reaction with the new batch of monomer manifests itself by the temperature of the polymerization mixture increasing. 5.8 g (100% of theory) of polybutylacrylate are obtained, having $M_n = 4.9$ kg/mol, $D = 1.4$.

What is claimed is:

1. In the process for the quasi-ionic polymerization of acrylic acid derivatives, in which the polymerization is initiated using organosilicon compounds as the initiators in the presence of nucleophilic or electrophilic catalysts and the polymerization is carried out at temperatures from −100° to +100° C., if appropriate in the presence of an aprotic solvent, the improvement which comprises to use as the initiator a mercaptosilane of the formula $$(R)_3Si-SR^1 \qquad (I)$$

in which
R is the radical of an optionally substituted aliphatic, cycloaliphatic, araliphatic or aromatic hydrocarbon and
$R^1$ is the $Si(R)_3$ radical or a $C_1$–$C_{10}$-alkyl radical which is monosubstituted or polysubstituted by trialkylsiloxy and/or trialkylsilylmercapto groups.

2. The process of claim 1, wherein the mercaptosilane is bis-(trimethylsilyl)sulphide, 1,2-bis-(trimethylsilylmercapto-ethane, 1-(trimethylsilylmercapto)-2-(trimethylsiloxy)-ethane or 1,4-bis-(trimethylsilylmercapto)-butane.

3. The process of claim 1, wherein the mercaptosilane is 1,2-bis-(trimethylsilylmercapto)-ethane or 1,4-(trimethylsilylmercapto)-butane.

4. The process of claim 1, wherein the catalyst is zinc iodide, diisobutylaluminium chloride, tris-(dimethylamino)-sulphonium difluorotrimethylsilicate, tetrabutylammonium fluoride, tris-(dimethylamino)-sul-

TABLE 1

| Example | Initiator, compound/ amount [ml/mmol] | Catalyst, compound/ amount [mmol] | Monomer, compound/ amount [ml/mmol] | Solvent, compound/ amount [ml] | Yield [g] | $M_n$ [kg/mol] | D | Remarks |
|---|---|---|---|---|---|---|---|---|
| 2 | B/0.5/1.9 | TASHF$_2$/0.1 | BA/5/35 | Acetonitrile/10 | 4.4 | 1.9 | 1.5 | |
| 3 | B/0.5/1.9 | TASHF$_2$/0.1 | BA/5/35 | THF/10 | 4.1 | 3.4 | 1.5 | stirred for 1 hr. before monomer added |
| 4 | A/0.75/2.9 | TBAF/0.05 | EHA/5/24 | THF/10 | 4.7 | 2.6 | 1.5 | |
| 5 | A/0.5/1.9 | TASHF$_2$/0.1 | BA/5/35 | THF/10 | 4.9 | 4.6 | 1.3 | |
| 6 | B/1.3/5.0 | BTAF/1.3 | EHA/10/48 | THF/20 | 8.8 | 1.9 | 1.3 | a few minutes induction time |
| 7 | D/1.0/4.8 | TBAF/5 | EA/5.4/50 | THF/20 | 5.2 | 0.64 | 1.3 | |
| 8 | B/1.3/5.0 | ZNI$_2$/0.4 | EA/5.2/48 | toluene/20 | 5.8 | 3.9 | 1.2 | a few minutes induction time |
| 9 | B/1.3/5.0 | ZNI$_2$/3 | EHA/10/48 | toluene/20 | 9.9 | 5.0 | 1.2 | a few minutes induction time |
| 10 | B/1.0/3.8 | ZNI$_2$/0.4 | BA/10/70 | toluene/20 | 9.2 | 3.5 | 1.1 | polymerization 5 hrs. at °C. | phonium fluoride, tetraalkylammonium bifluorides, potassium bifluoride, benzyltrimethylammonium fluoride or benzyltrimethylammonium bifluoride.

5. The process of claim 1, wherein the catalyst is a catalyst which forms fluoride or bifluoride ions.

6. The process of claim 5, wherein the catalyst is tris-(dimethylamino)-sulphonium difluorotrimethylsilicate, tetrabutylammonium fluoride, tris-(dimethylamino)-sulphonium difluoride, tetraalkylammonium bifluorides, potassium bifluoride, benzyltrimethylammonium fluoride or benzyltrimethylammonium bifluoride.

7. The process of claim 5, wherein the catalyst used is a catalyst which forms a bifluoride ion.

8. The process of claim 1, wherein the acrylic acid derivative is an acrylic acid ester.

* * * * *